US006793447B2

(12) United States Patent
Antonini

(10) Patent No.: US 6,793,447 B2
(45) Date of Patent: Sep. 21, 2004

(54) METHOD AND DEVICE TO MAKE HOLES FOR COMPONENTS OF WINGS FOR DOORS OR WINDOWS

(76) Inventor: Emilio Antonini, Via Romagna, 25, 34100 Trieste (IT)

(*) Notice: Subject to any disclaimer, the term of this patent is extended or adjusted under 35 U.S.C. 154(b) by 274 days.

(21) Appl. No.: 09/981,481

(22) Filed: Oct. 16, 2001

(65) Prior Publication Data

US 2002/0062623 A1 May 30, 2002

Related U.S. Application Data

(60) Provisional application No. 60/249,983, filed on Nov. 20, 2000.

(30) Foreign Application Priority Data

Oct. 17, 2000 (IT) .................................... UD2000A0194

(51) Int. Cl.[7] ................................................ B23B 35/00

(52) U.S. Cl. ............................. 408/1 R; 408/3; 408/53; 408/95

(58) Field of Search ............................. 408/1 R, 3, 13, 408/51, 53, 88, 95, 98, 234, 237; 700/160, 180, 185; 144/2.1, 93.1

(56) References Cited

U.S. PATENT DOCUMENTS

| | | | | | |
|---|---|---|---|---|---|
| 3,230,797 | A | * | 1/1966 | Murschel | 408/89 |
| 3,245,289 | A | * | 4/1966 | Nelson | 408/98 |
| 3,290,966 | A | * | 12/1966 | Gesko | 408/16 |
| 3,752,596 | A | * | 8/1973 | Weyand et al. | 408/234 |
| 4,050,838 | A | * | 9/1977 | Kneip | 408/46 |
| 5,265,986 | A | * | 11/1993 | Prokopp | 408/3 |
| 5,469,658 | A | | 11/1995 | Digianni et al. | |
| 5,930,952 | A | | 8/1999 | Fernando et al. | |
| 6,099,212 | A | * | 8/2000 | Marocco | 408/3 |
| 6,314,680 | B1 | * | 11/2001 | Buckwalter et al. | 49/82.1 |

FOREIGN PATENT DOCUMENTS

| | | | | |
|---|---|---|---|---|
| FR | 611000 | * | 9/1926 | 408/88 |
| SU | 466987 | * | 7/1975 | 408/98 |

* cited by examiner

*Primary Examiner*—Daniel W. Howell
(74) *Attorney, Agent, or Firm*—Akin Gump Strauss Hauer & Feld, L.L.P.

(57) ABSTRACT

Method and device to make holes for components of wings for doors or windows comprising a frame consisting of uprights (14) on which blinds (16) oscillating with respect to an axis are mounted. The method provides to calculate the number of blinds (16) which can be applied in the wing and the interaxis "p" of the assembly holes (17) by dividing the height of the wing gap by the height of said blinds (16), rounding up the result of the division to obtain a whole number, calculating the overlap value between each blind (16) relation to the number of blinds (16) to be applied and comparing the overlap value obtained from this calculation with a pre-defined minimum value. If the overlap value is more than the minimum value, the number of blinds (16) is maintained and the pitch "p" is calculated by dividing the height of the wing gap by said number of blinds (16); if the overlap value is less than the minimum value, the number of blinds is increased by one unit, the new overlap is calculated, compared with the pre-defined minimum value, and the pitch "p" is calculated according to the new number of blinds (16).

6 Claims, 3 Drawing Sheets

METHOD AND DEVICE TO MAKE HOLES FOR COMPONENTS OF WINGS FOR DOORS OR WINDOWS

CROSS-REFERENCE TO RELATED APPLICATIONS

This Non-provisional Patent Application is based on Provisional Patent Application No. 60/249,983, filed Nov. 20, 2000, the disclosure of which is incorporated herein by reference.

BACKGROUND OF THE INVENTION

The invention concerns a device to make holes in the uprights of a frame of a wing for doors or windows of the type with the selective regulation of the light through strips, or blinds, oscillating around at least one axis.

The invention also concerns a method to calculate, in a substantially automatic fashion, according to the height of the wing gap ad the standardized height of each single blind, the number of blinds which can be applied to the wing and the interaxis, or pitch, between the holes by which the blinds are attached to said frame.

The device is substantially composed of a hole-making assembly, a programmable command unit which governs said hole-making assembly and a control panel to set the parameters and verify that operations are correct.

The state of the art includes wings for doors or windows comprising a frame consisting of one or more lower cross-pieces, one or more upper cross-pieces and substantially vertical uprights orthogonal to said upper and lower cross-pieces, on which a plurality of blinds are mounted, parallel and contiguous, and are able to be moved to allow more or less light to pass.

The blinds pivot oscillating with respect to said uprights and can assume a first position wherein they totally prevent the light from passing, a second position wherein they allow a maximum amount of light to pass, and a plurality of intermediate positions between said first and second position.

It is also known that making holes to attach the blinds to the frame is usually done with a constant pitch and has to take into account the size of the door or window, and hence the gap defined by the frame of the wing, and the size, particularly the height, of the blinds which will be applied.

The wing gap is usually a fixed parameter, restricted by the size of the door or window in which it is applied, and therefore restricts the fiber and pitch of the blinds which can be applied.

In the state of the art, the usual procedure is to calculate the number of blinds which it is desired to apply in the wing, and then calculate the interaxis at which the blinds are attached to ensure that a desired condition of partial superimposition, or minimum overlap, is obtained between adjacent blinds.

In accordance with these calculations, the height of the blinds is then adjusted, by trimming then lengthwise before sanding and the final varnishing or painting.

On the contrary, if pre-painted and surface finished elements are used, either for the frame or the blinds, it is not possible to carry out said trimming and the value of the height of the blind constitutes a fixed parameter which cannot be modified after the interaxis has been calculated.

This entails identifying a method of calculation which will ensure it is possible to design a wing in such a manner as to respect the desired requisites of reciprocal positioning of the blinds, so as to ensure a precise functioning and high level of efficiency thereof in opening/closing the wing gap.

To make the holes in the wing uprights on which the blinds are attached oscillating, semi-automatic machines are conventionally used, substantially composed of a hole-making assembly, a base structure and an electric panel inside which there is the programmable unit, for example a PLC, able to give commands in a logical sequence to the whole machine.

In such conventional machines, however, an automatic calculation method is not provided suitable to supply, according to fixed and pre-settable parameters input to the machine, the value of interaxis according to which the holes have to be made to allow to mount a desired number of blinds of a standardized height in a reciprocal position such as to ensure a desired condition of partial superimposition, or overlap.

Document U.S. Pat. No. 5,469,658 describes a wing including a frame and a plurality of oscillating blinds, made of plastic and able to be moved by means of a rack which cooperates with gears mounted in cooperation with the pins on which said blinds oscillate. This document provides that the blinds can be mounted on the uprights of the frame with variable interaxes, according to the size of the space available and according to the necessary number of blinds to be installed. This variability is allowed by the fact that, thanks to the presence of the rack ad the movement gears, it is possible to avoid including a command rod and oscillating hinges.

However, this document does not disclose a unified and standardized method of calculation which provides to define a minimum overlap, and possibly a maximum overlap, between adjacent blinds, in order to calculate the number of blinds which can be applied in a defined gap of a wing for doors or windows.

It must be stressed that if two adjacent blinds do not have a certain minimum value of reciprocal overlap, they can rotate with respect to each other beyond the position of substantial alignment, and/or they can allow rays of light to pass even in an apparently closed condition.

Instead, if two adjacent blinds have an overlap value of more than a defined maximum value, there is an economic problem because more blinds than necessary are used, a practical problem concerning the efficient movement of the blinds and an aesthetic problem concerning the excessive density and excessive overlap, particularly when the blinds have shapings or waves in their profile.

U.S. '658 provides to vary the interaxis and calculate the assembly positions of the blinds by means of a computer, but does not define the criteria in order to guarantee that an effective result is obtained both from a practical and aesthetic point of view.

The present Applicant has devise and embodied this invention to overcome the shortcomings of the state of the art and to obtain further advantages.

BRIEF SUMMARY OF THE INVENTION

The invention is set forth and characterized in the respective main claims, while the dependent claims describe other innovative characteristics of the invention.

The main purpose of the invention is to achieve a method which can be applied to a hole-making device, which will enable to make an automatic calculation of the pitch at which a plurality of holes have to be made to attach, in a wing for doors or windows, a plurality of oscillating blinds able to permit a selective passage of the light.

To be more exact, after determining the number of blinds applicable to the wing, the method according to the invention allows to calculate the pitch, so as to ensure an overlap greater than a minimum pre-determined value and such as to guarantee an efficient functioning of the wing, particularly when the blinds are in the closed position.

According to a variant, the method also provides to pre-define a maximum overlap value beyond which two adjacent blinds must not overlap.

Another purpose is to achieve the hole-making device which fulfils this method.

The invention is applied in wings for doors or windows which use substantially standardized components, pre-painted or pre-varnished and surface finished, which cannot be trimmed at least in height.

In accordance with these purposes, the device according to the invention comprises at least hole-making means mounted on movement means and able to make in sequence a plurality of holes on one or more uprights, guide means on which said hole-making means are able to move and a command and control unit able to automatically calculate the pitch at which the holes have to be made after receiving, as input data, the fixed parameters of the wing, and to condition to this end the activation of the hole-making means.

The hole-making device also comprises a base structure on which said guide means are mounted; positioning and clamping means able to position and clamp said uprights in the position in which the holes will be made therein are also mounted on said base structure.

The command and control unit is able to receive and process the input data, perform the calculations concerning the number of blinds, the pitch and the overlap and, in a preferential embodiment, to display the results of said calculations.

The calculation method substantially provides the following passes: the usable height of the wing, that is the height of the gap, is divided by the standardized height of each individual blind chosen; this calculation normally gives a decimal number, which is rounded up to obtain the number of blinds.

Then the difference between the height occupied by all the blinds calculated thus and the wing gap is divided by the number of blinds, to obtain the value of the overlap relating to each pair of adjacent blinds. The overlap must be greater than a minimum value set as an obligatory parameter. If the value of the overlap given by the calculation is less than said minimum value, another blind is added and the calculation is repeated, taking care that, with this extra blind, the overlap does not exceed a pre-set maximum value.

From the definitive number of blinds we finally obtain the pitch at which the holes have to be made on the uprights.

According to said calculations the command and control unit determines the activation of the hole-making assembly so that it makes the holes according to the constant pitch determined by the calculations.

BRIEF DESCRIPTION OF THE SEVERAL VIEWS OF THE DRAWINGS

These and other characteristics of the invention will become clear from the following description of a preferential form of embodiment, given as a non-restrictive example, with reference to the attached drawings wherein.

DETAILED DESCRIPTION OF THE INVENTION

Figure 1:
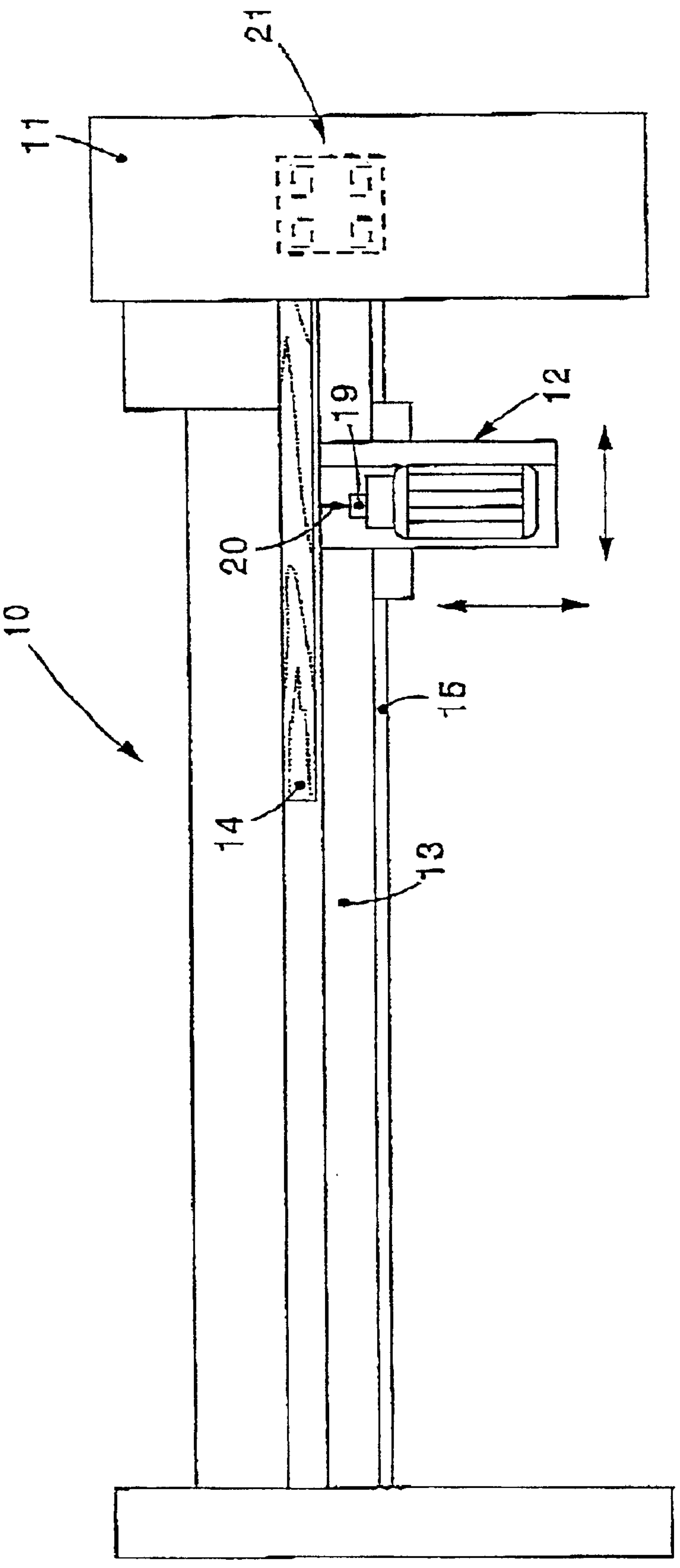
FIG. 1 is a view from above of the hole-making device according to the invention.
Figure 2:
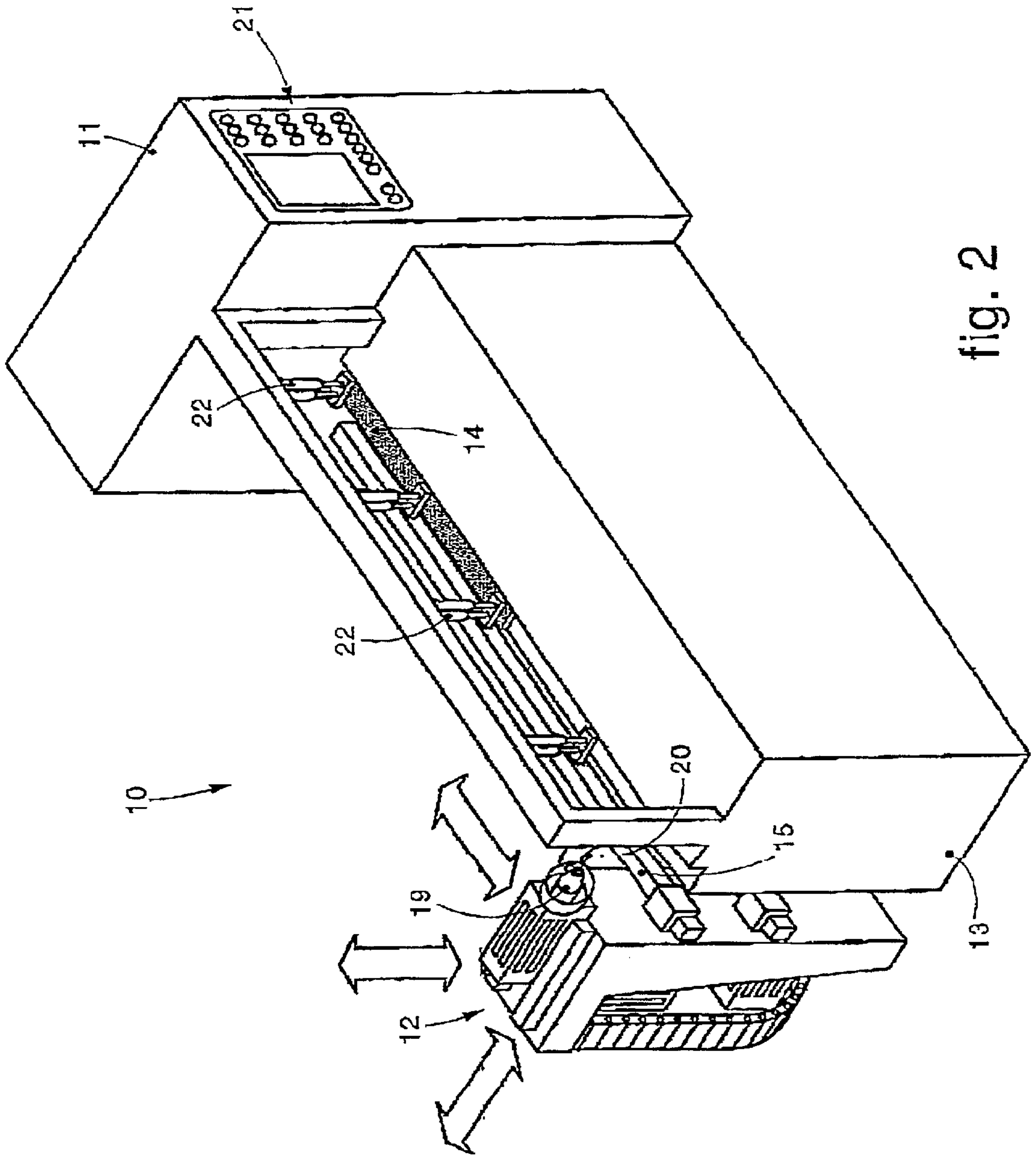
FIG. 2 is a three-dimensional view of the device in FIG. 1.
Figure 3:
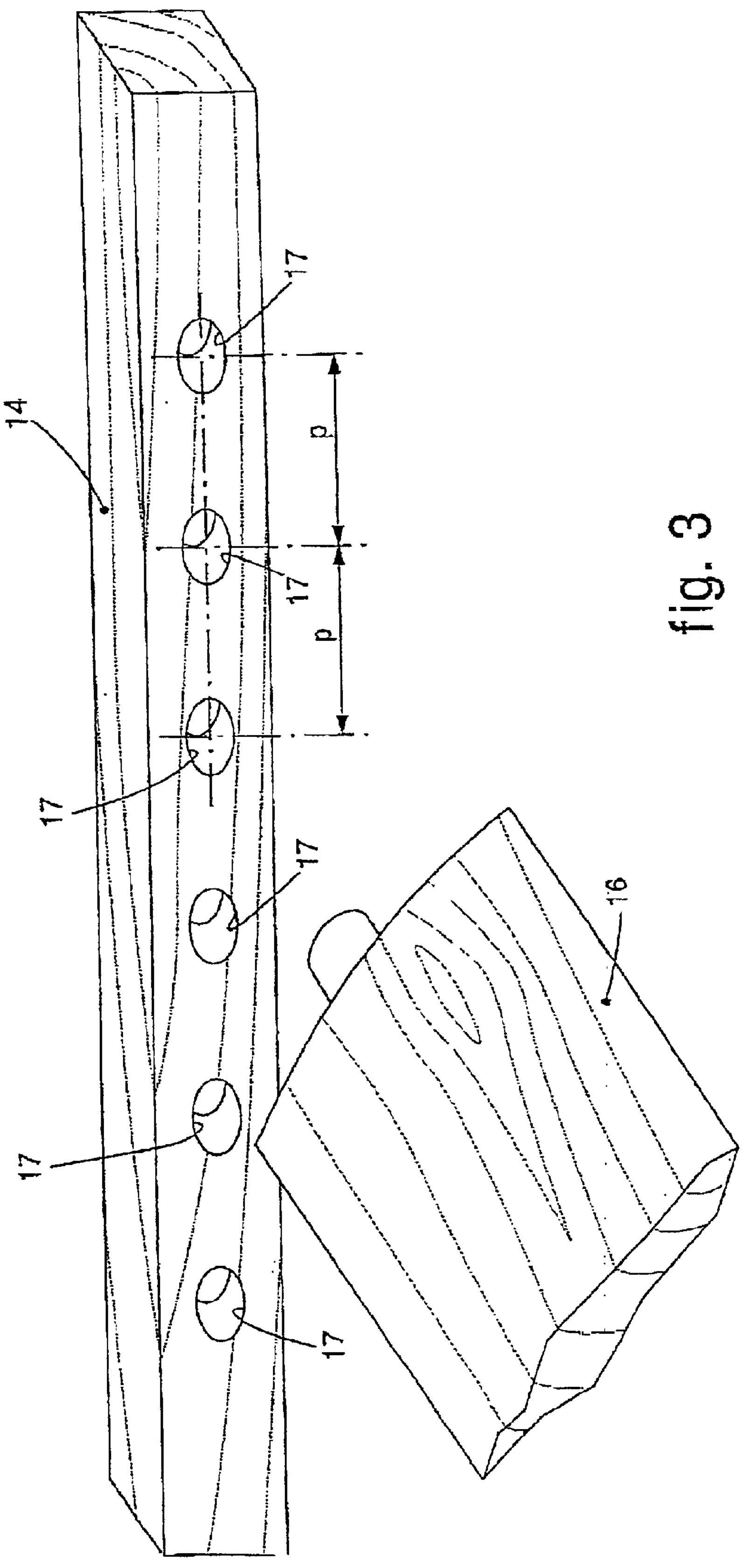
FIG. 3 is a partial three-dimensional view of an upright holed at a constant pitch with a relative blind.

With reference to the attached drawings, the number 10 indicates a device for making holes in uprights 14 on wings where a plurality of blinds 16 oscillating around at least one axis will be applied at a constant pitch. Preferentially, at least the uprights 14 and the blinds 16 of the wing are made of wood.

The device 10 is substantially formed by a base 13 on which a motorized hole-making assembly 12 is able to slide, mounted on horizontal guides 15; the hole-making assembly 12 is able to make a series of holes 17 with a constant pitch on one or more of said uprights 14.

The motorized hole-making assembly 12 can be moved on three axes in order to adjust its working position according to the size and number of uprights 14 which have to be holed. The holes on the uprights 14 are made on the side, to facilitate a correct discharge of the chips created.

The upright 14 is positioned, manually or automatically, on the machine 10 with the side to be holed facing towards the hole-making assembly 12. A combination of pressure and alignment elements 22, advantageously of the pneumatic type, are able to keep the upright 14 in the correct position during the hole-making process, and to release it when the operation is terminated. The hole-making assembly 12 is also equipped with a head 19 able to support and mechanically adjust the speed of rotation of the drill bits 20.

The movement of the hole-making assembly 12 is managed by a command panel 11 inside which there is at least a programmable command and control unit 21.

The command and control unit 21 is able not only to drive the motors of the hole-making assembly 12 to allow a controlled displacement thereof, but also to automatically calculate the interaxis "p" between the holes 17 to be made, according to the obligatory parameters set by the operator, which are the gap of the wing to be made and the standardized height of the blinds 16 to be used.

To better understand the calculation method used in the invention we shall now give a numerical example.

In a wing for windows having a gap of 337 mm, we want to mount blinds 16 with a height of 64 mm each. On making the calculations, to cover the gap without any overlap there would have to be 5.265 (337/64=5.265) blinds 16. Since it is necessary to have a whole number of blinds 16, and impossible to modify the height thereof by trimming, we round up the result of the division, and thus obtain a value of six blinds 16. However, the space occupied by six blinds 16 is 384 mm (64×6=384), therefore a greater value than that of the gap to be covered.

The command and control unit 21 automatically calculates the value of the overlap between adjacent blinds 16, represented by the difference between the space occupied by the six blinds 16 and that of the gap; the result of the difference is divided by the number of blinds 16, that is $$\left(\frac{384-337}{6}=7,8\right),$$

in the working hypothesis that we have the same overlap for all the blinds 16.

If the value of overlap equal to 7.8 mm is considered acceptable, that is to say, greater than a predefined minimum value, then the number of blinds 16, that is, six, is accepted, and then the unit 21 calculates the interaxis "p" which will be the result of dividing the wing gap and the number of blinds, that is, six. If the overlap is less than the preestablished value, we add another blind, another calculation of the overlap is made and the pitch "p" is calculated by dividing the value of the wing gap by seven.

The control unit 21, according to a variant, then makes a verification to make sure that the new overlap value is lower than a pre-defined maximum value, in order to avoid aesthetic problems concerning the excessive overlap of adjacent blinds.

These operations are performed automatically by the command and control unit 21 which then provides to command the hole-making assembly 12 to move automatically from a zero position, so that it moves along the horizontal side 15 six times a length equal to the pitch "p" and that, with every pitch "p", makes a hole 17 of the desired diameter and depth.

It is obvious however that modifications and/or additions can be made to the method and device for making holes for components of wings for doors or windows 10 as described heretofore, without departing from the spirit and scope of the invention.

According to a variant, the guide 15 is vertical and the hole-making assembly 12 moves vertically by the pitch "p".

According to another variant, a plurality of uprights 14 are loaded, one on top of the other, while the head 19 is able to support a plurality of drill bits 20, arranged orthogonally to the guide 15 and equal in number to the uprights 14.

According to a further variant, a plurality of hole-making assemblies 12 are mounted on the guide 15.

It is also obvious that, although the invention has been described with reference to specific examples, a skilled person shall certainly be able to achieve many other equivalent forms of the method and device to make holes for components of wings for doors or windows, all of which shall come within the field and scope of this invention.

What is claimed is:

1. Method to make holes for components of wings for doors or windows of the type comprising a frame consisting of at least an upright (14) on which are mounted, with the respective axes distanced from each other, a plurality of blinds (16) oscillating with respect to at least one axis, said blinds (16) being arranged contiguous to each other and having at least a substantially standardized height which cannot be modified during assembly, characterized in that, in order to calculate the number of blinds (16) which can be applied in the wing and to calculate the interaxis "p" of the assembly holes (17) for said blinds (16), it provides the following steps:

the height of the wing gap is divided by the standardized height of said blinds (16);

the result of this division is rounded up to obtain a whole number;

the value of the overlap between each blind (16) is calculated according to the whole number of blinds (16) to be applied;

the value of the overlap obtained from this calculation is compared with a pre-defined minimum value;

if the overlap value is more than said minimum value, the number of blinds (16) to be applied is maintained, and the pitch "p" is calculated by dividing the height of the wing gap by said number of blinds (16);

if the overlap value is less than said minimum value, the number of blinds (16) is increased by one unit, the overlap is again calculated and compared with the pre-defined minimum value, and the pitch "p" is calculated according to the new number of blinds (16); and drilling a plurality of holes (17) at intervals according to said pitch "p" along said upright (14).

2. Method as in claim 1, characterized in that it provides a step to verify that the overlap value is lower than a pre-defined maximum value.

3. Device to make holes for components of wings for doors or windows of the type comprising a frame consisting of at least an upright (14) on which are mounted, with the respective axes distanced from each other, a plurality of blinds (16) oscillating with respect to at least one axis, said blinds (16) being arranged contiguous to each other and having a substantially standardized height which cannot be modified during assembly, said device comprising at least a hole-making assembly (12) movable in a controlled fashion on guide means (15), a base (13), and a control panel (11) associated with at least a command and control unit, characterized in that said command and control unit (21) is able to receive input data relating to at least the height of the wing gap and the standardized height of the blinds (16) to be mounted, to calculate the number of blinds (16) which can be applied and the relative pitch "p" to obtain a value of overlap between the blinds (16) greater than a pre-defined minimum value, and to command said hole-making assembly (12) to make a plurality of holes (17), automatically and sequentially, at intervals according to said pitch "p" along said upright (14).

4. Device as in claim 3, characterized in that said base (13) comprises at least a positioning and claiming element (22) able to position and clamp said upright (14) in the position in which it will be drilled by said hole-making assembly (12).

5. Device as in claim 4, characterized in that said positioning and clamping element (22) is able to clamp two or more uprights (14) one on top of the other in a hole-making position, and that said hole-making assembly (12) is able to support a head (19) equipped with a plurality of drill bits (20) mating in number with that of the uprights (14) worked simultaneously.

6. Device as in claim 3, characterized in that said hole-making assembly (12) is able to move on three axes in order to position a relative hole-making head (19) in cooperation with one side of said upright (14) to be drilled.

* * * * *